(12) United States Patent
Dawson (10) Patent No.: US 9,640,998 B2
(45) Date of Patent: May 2, 2017

(54) AC POWER OVER ETHERNET

(71) Applicant: Avaya Inc., Basking Ridge, NJ (US)

(72) Inventor: John E. Dawson, Vancouver, WA (US)

(73) Assignee: Avaya Inc., Santa Clara, CA (US)

( * ) Notice: Subject to any disclaimer, the term of this patent is extended or adjusted under 35 U.S.C. 154(b) by 559 days.

(21) Appl. No.: 14/066,635

(22) Filed: Oct. 29, 2013

(65) Prior Publication Data

US 2015/0115741 A1    Apr. 30, 2015

(51) Int. Cl.
| | |
|---|---|
| *H04M 1/24* | (2006.01) |
| *H04M 3/08* | (2006.01) |
| *H04M 3/22* | (2006.01) |
| *H02J 4/00* | (2006.01) |
| *G06F 1/26* | (2006.01) |

(52) U.S. Cl.
CPC .............. *H02J 4/00* (2013.01); *G06F 1/266* (2013.01); *Y10T 307/826* (2015.04)

(58) Field of Classification Search
CPC ........ G06F 1/30; G06F 1/3209; G06F 13/385; G06F 1/1632; G06F 1/26; H04M 1/72527; H04M 1/7253; H04M 2250/02

USPC .............. 379/1.01, 1.04, 26.01, 27.01
See application file for complete search history.

(56) References Cited

U.S. PATENT DOCUMENTS

| | | | | |
|---|---|---|---|---|
| 6,791,336 | B2 * | 9/2004 | Krigel | G06F 17/509 |
| | | | | 324/539 |
| 7,426,262 | B2 * | 9/2008 | Rosenberg | H04B 3/493 |
| | | | | 379/1.03 |
| 7,994,798 | B2 * | 8/2011 | Williams | G01R 31/2829 |
| | | | | 318/139 |
| 8,948,018 | B2 * | 2/2015 | Afzal | H04B 10/071 |
| | | | | 370/241 |
| 2002/0106058 | A1 * | 8/2002 | Swale | G01R 31/14 |
| | | | | 379/26.01 |
| 2005/0044431 | A1 * | 2/2005 | Lang | H04L 12/10 |
| | | | | 713/300 |
| 2005/0262364 | A1 * | 11/2005 | Diab | H04L 12/10 |
| | | | | 713/300 |
| 2007/0021094 | A1 * | 1/2007 | Elkayam | H04L 12/10 |
| | | | | 455/402 |
| 2013/0187632 | A1 * | 7/2013 | Ohana | H04L 12/10 |
| | | | | 324/103 R |

\* cited by examiner

*Primary Examiner* — Quoc D Tran (74) *Attorney, Agent, or Firm* — IP Spring (57) ABSTRACT

Methods, systems and computer readable media for providing AC power over a computer network (e.g., Ethernet) are disclosed.

20 Claims, 7 Drawing Sheets

AC POWER OVER ETHERNET

TECHNICAL FIELD

Embodiments relate generally to providing electrical power over computer networks, and more particularly, to methods, systems and computer readable media for providing AC power over a computer network, such as Ethernet.

BACKGROUND

Some conventional power-over-Ethernet (POE) standards and solutions may focus on providing direct current (DC) power. The power requirements associated with the DC POE systems continue to increase, for example, with POE providing up to 16 W, POE+ providing up to 32 W and U-POE providing up to 64 W. The distribution of DC power over Ethernet may not be able to scale up much beyond current levels without encountering problems typically associated with DC power distribution. Accordingly, a need may exist for an alternating current (AC) POE solution.

Current AC power distribution within a structure often requires a licensed electrician, one or more permits and one or more inspections prior to approval of the installation. These layers of licensing, permitting and inspection are in place to address, among other things, the safety issues involved with AC power distribution.

Embodiments were conceived in light of the above mentioned needs, problems and/or limitations, among other things.

SUMMARY

One or more embodiments can include methods, systems and computer readable media for AC POE.

Some implementations can include a method comprising providing a first type of power from a switch to a remote power consuming device, the first type of power configured to provide power to a communications module of the power consuming device. The method can also include testing an integrity of a cable connecting the switch and the remote power consuming device. The method can further include performing a handshake operation between the switch and the remote device to establish a communications link. The method can also include providing a second type of power via the cable when the handshake operation is successful and a result of the testing indicates cable integrity sufficient for the second type of power to be applied.

The first type of power can be alternating current with protection circuitry to provide a relatively low-voltage and low-current characteristic. The protection circuitry would ensure the first type of power was considered relatively "safe" even in the event of common failures or installation issues. The second type of power can include alternating current, with a relatively high-voltage and high-current characteristic, that would otherwise be considered hazardous without cable integrity inspections and continuous monitoring circuitry. The method can further include determining, at the switch, a power requirement of the remote power consuming device. The method can also include providing a status indication upon completion of the cable integrity checking. The method can further include monitoring, in real-time, the second type of power being provided on the cable via one or more current sensing elements.

The cable testing can include testing the cable using a cable tester. The cable tester can include a time-domain reflectometer, or similar mechanism, to detect a balanced and properly terminated load connected to the remote end of the cable. The cable testing could also provide the ability to inspect for unintended impairments or unplanned connections on the power pathways between the switch and remote power consuming device.

Some implementations can include a system comprising one or more processors configured to perform operations. The operations can include performing an integrity test of a cable configured to carry high power from a switch to a remote power consuming device and, when the integrity test passes, connecting a high power source to the cable. The operations can also include monitoring current flow on the cable. The operations can further include removing the high power source if an abnormality is detected in the current flow.

The integrity test passing can include detecting a balanced and properly terminated load connected to the cable. The high power source can be an AC power source.

The operations can further comprise determining, at the switch, a power requirement of the remote power consuming device. The operations can further comprise providing a status indication upon completion of the cable integrity checking. The monitoring can include real-time monitoring. The cable integrity testing can include testing the cable using a cable tester. The cable tester can include a time-domain reflectometer.

Some implementations can include a nontransitory computer readable medium having stored thereon software instructions that, when executed by one or more processors, cause the processors to perform operations. The operations can include providing a first type of power from a switch to a remote power consuming device, the first type of power configured to provide power to a communications module of the power consuming device. The operations can also include testing an integrity of a cable connecting the switch and the remote power consuming device. The operations can further include performing a handshake operation between the switch and the remote device to establish a communications link. The operations can also include providing a second type of power via the cable when the handshake operation is successful and a result of the testing indicates cable integrity sufficient for the second type of power to be applied.

The first type of power can be direct current. The second type of power can be alternating current. The operations can further include determining, at the switch, a power requirement of the remote power consuming device. The operations can also include providing a status indication upon completion of the cable integrity checking. The operations can further include monitoring, in real-time, the second type of power being provided on the cable via one or more current sensing elements. The cable testing can include testing the cable using a cable tester. The cable tester can include a time-domain reflectometer.

DETAILED DESCRIPTION

Human and property safety are primary concerns for high-voltage/high power electrical systems, such as AC distribution systems. As mentioned above, these safety concerns are often addressed through a manual system of licensing, permitting and inspection. Implementations of the present system, method and computer readable media can be used to provide automation to help monitor the safety of AC power distribution and thus create an environment in which AC power may be provided over a computer network and wired or connected by people other than licensed electricians.

Technology such as time-domain reflectometry (TDR), periodic and/or continuous continuity checking, ground fault interruption (or other current sensing mechanisms) and electronic communications can be applied to AC POE to provide safety measures.

Figure 1:
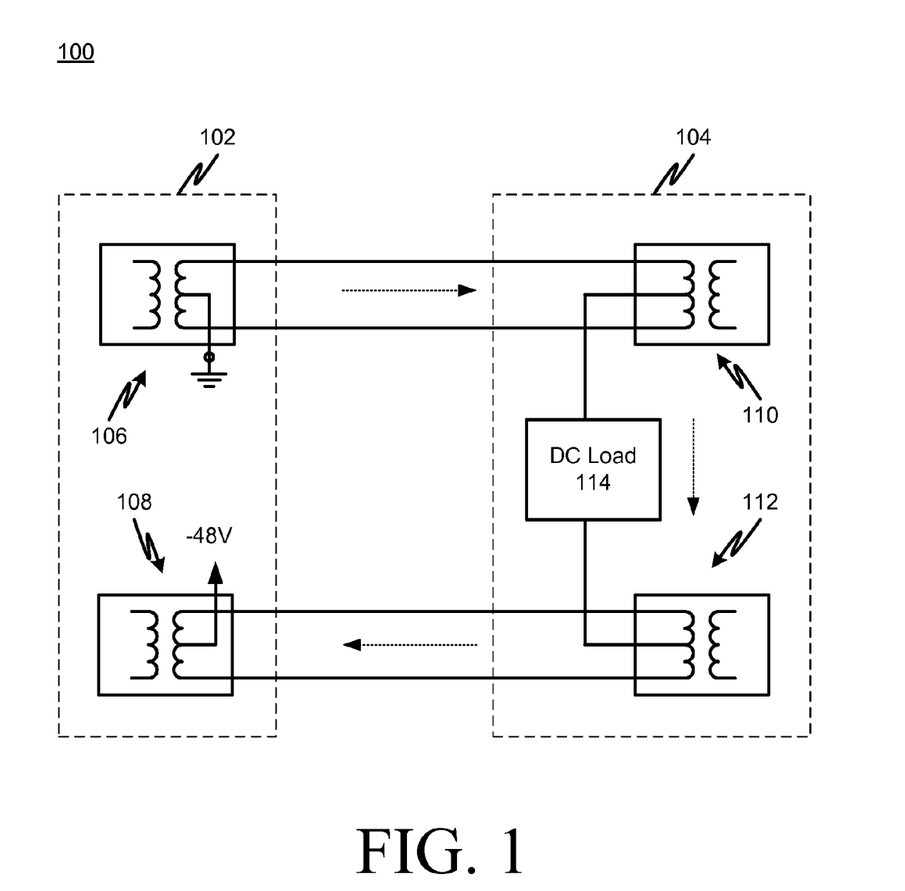
FIG. 1 is diagram of an example DC POE system.

FIG. 1 shows an example industry-standard POE system 100 for use with DC power. A data networking switch 102 provides DC power to a device (e.g., a telephone) 104. The switch includes a first transformer 106 and a second transformer 108. The device 104 includes a first transformer 110, a second transformer 112 and a DC load 114. A phantom current is introduced via the center taps of the transformers and travels down both legs of a wire pair and through the DC load 114.

Figure 2:
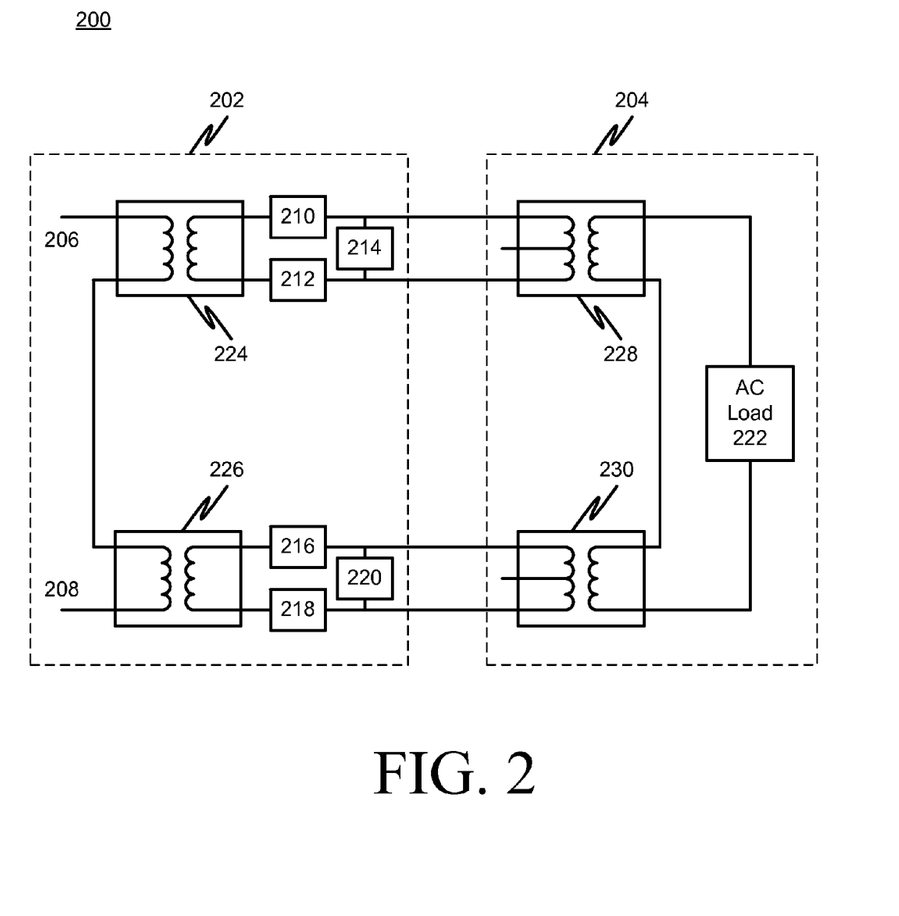
FIG. 2 is a diagram of an example AC POE system in accordance with at least one implementation.

FIG. 2 shows an example AC POE 200 that includes a switch 202 and a power consuming device 204. The switch 202 includes an AC hot connection 206, an AC neutral connection 208, a first current sensing element 210, a second current sensing element 212, a first cable tester 214, a third current sensing element 216, a fourth current sensing element 218, a second cable tester 220, a first transformer 224 and a second transformer 226. It will be appreciated that the switch 202 can include any type of computer network infrastructure element such as a switch, a router, a bridge or the like. The power consuming device 204 includes an AC load 222, a first transformer 228, and a second transformer 230.

In operation, the switch 202 can test the integrity of the connections via the current sensing elements (210, 212, 216, and 218) and/or the cable testers (214 and/or 220). Once the integrity of the cable connections is determined to be safe, AC power can be applied. The AC power could be supplied using multiples of standard AC voltages (e.g., 120V, 240V, 480V or the like). The voltage levels can be readily configured using the electrical transformers (e.g., 224, 226, 228 and/or 230). Applying higher voltages may not be necessarily more dangerous as the connections are monitored continuously independent of the selected voltage.

By including AC power distribution within a computer network infrastructure using the safety checking methods and systems described herein, it may be possible to eliminate a need for a certified and/or licensed electrician. The patch panels and structured wiring techniques used in network installations can be engineered to support AC power considerations and concerns. Network installation technicians can be handling data network and power requirements within a single installation.

Having AC and DC power coexist on the same cabling can raise certain issues (e.g., cross-coupling). However, these issues can be addressed using a system that first brings up DC power to power on electronics and/or controller that then negotiate for AC power application. These negotiation-type systems are described in greater detail below.

Figure 3:
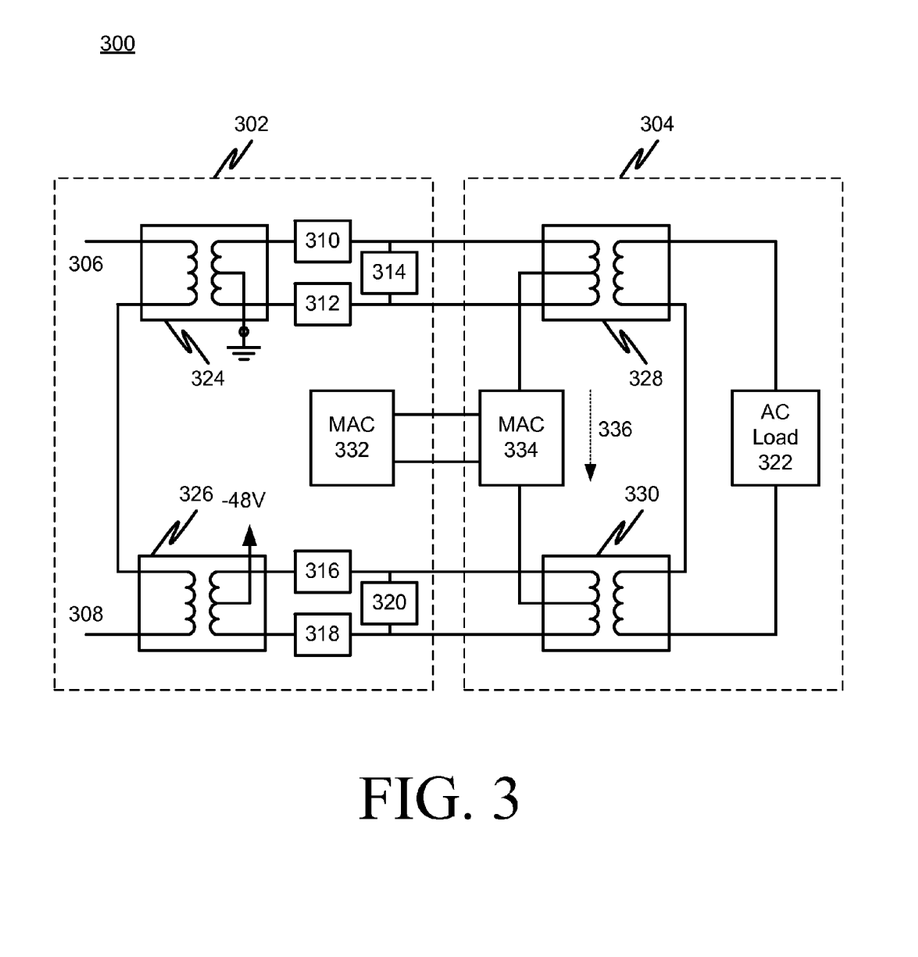
FIG. 3 is a diagram of an example AC POE having an auto-negotiating capability in accordance with at least one implementation.

FIG. 3 is a diagram of an example AC POE system 300 that includes a switch 302 and a power consuming device 304. The switch 302 includes an AC hot connection 306, an AC neutral connection 308, a first current sensing element 310, a second current sensing element 312, a first cable tester 314, a third current sensing element 316, a fourth current sensing element 318, a second cable tester 320, a first transformer 324, a second transformer 326, and a media access controller (MAC) 332. It will be appreciated that the switch 302 can include any type of computer network infrastructure element such as a switch, a router, a bridge or the like. The power consuming device 304 includes an AC load 322, a first transformer 328, a second transformer 330, and a MAC 334. The cable testing elements described herein can include a TDR element or the like. The current sensing elements described herein can include a current sensor, a GFI detector or the like.

In operation, the switch 302 can provide power via a DC circuit to activate the remote MAC 334. A control circuit can help test the integrity of the high voltage pathway via the current sensing elements (310, 312, 316, and 318) and/or the cable testers (314 and/or 320).

The power requirements of the power consuming device 304 can be determined during an auto-negotiation phase in which the power consuming device 304 communicates power requirements to the switch 302 via the respective MACs 334 and 332. Once the integrity of the cable connections is determined to be safe, and following a successful handshaking sequence between the switch 302 and the power consuming device 304, the DC power can be removed and the AC power can be applied.

The AC power could be supplied using multiples of standard AC voltages (e.g., 120V, 240V, 480V or the like). The voltage levels can be readily configured using the electrical transformers (e.g., 324, 326, 328 and/or 330).

Grounding can be provided in a variety of ways. For example, in a Gigabit Ethernet embodiment, where power wire pairs may be needed for signaling as well, a ground could be added to the center tap of the AC neutral side. This could create essentially a phantom ground between the switch and the power consuming device.

The configuration could be different for 10/100 Ethernet implementations, where the power pairs of wires may not be needed to carry packetized data (e.g., in-band signals) directly associated with the network communication protocol. In other implementations, grounds could be placed on center taps of transformers. Also, a safety ground could be provided to the remote power consuming device.

Figure 4:
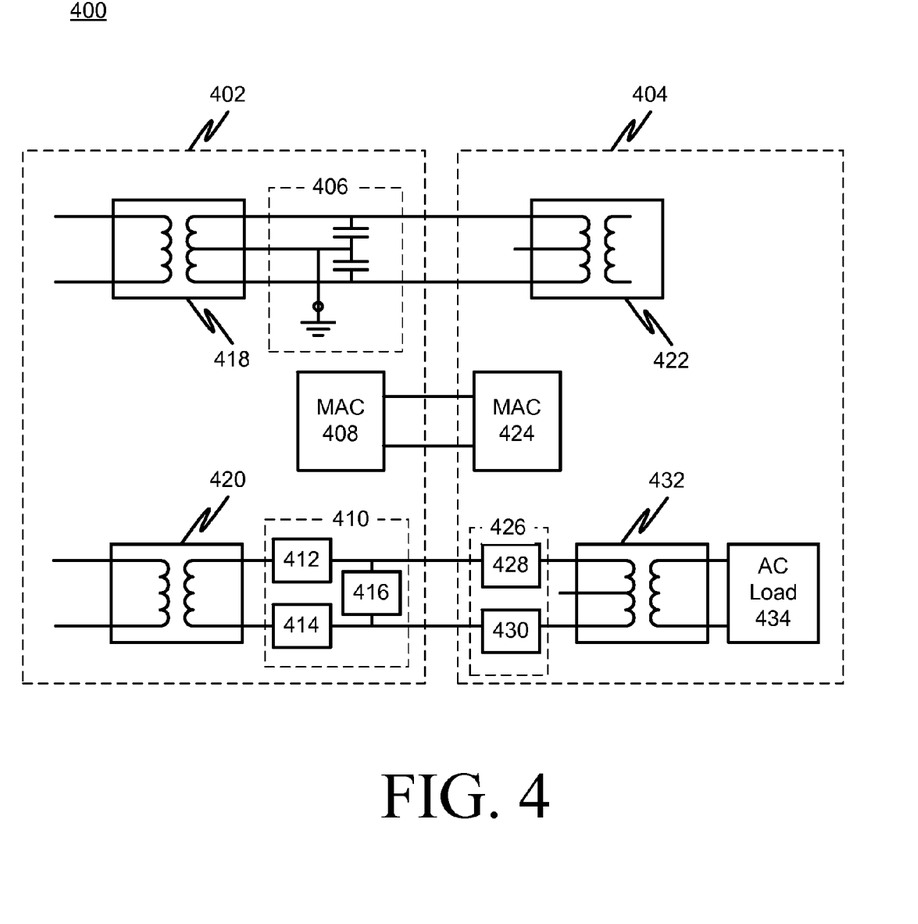
FIG. 4 is a diagram of an example AC POE system having a low power circuit and a high power circuit in accordance with at least one implementation.

FIG. 4 is a diagram of an example AC POE system 400 that includes a switch 402 and a power consuming device 404. The switch 402 includes a low voltage circuit section having a step-down transformer 418 and a protection circuit 406. A corresponding low voltage section on the power consuming device 404 includes a step up transformer 422.

The switch 402 and the power consuming device 404 each include a MAC, 408 and 424 respectively. The switch includes a high-voltage section having a step-up transformer 420 and a cable test and real-time monitoring section 410 including a first current sensing element 412, a second current sensing element 414 and a cable tester 416. The power consuming device 404 includes a corresponding cable test and real-time monitoring section 426 that includes a first current sensing element 428 and a second current sensing element 430.

The switch 402 and power consuming device 404 operate according to the methods described below in connection with FIGS. 5 and 6.

Figure 5:
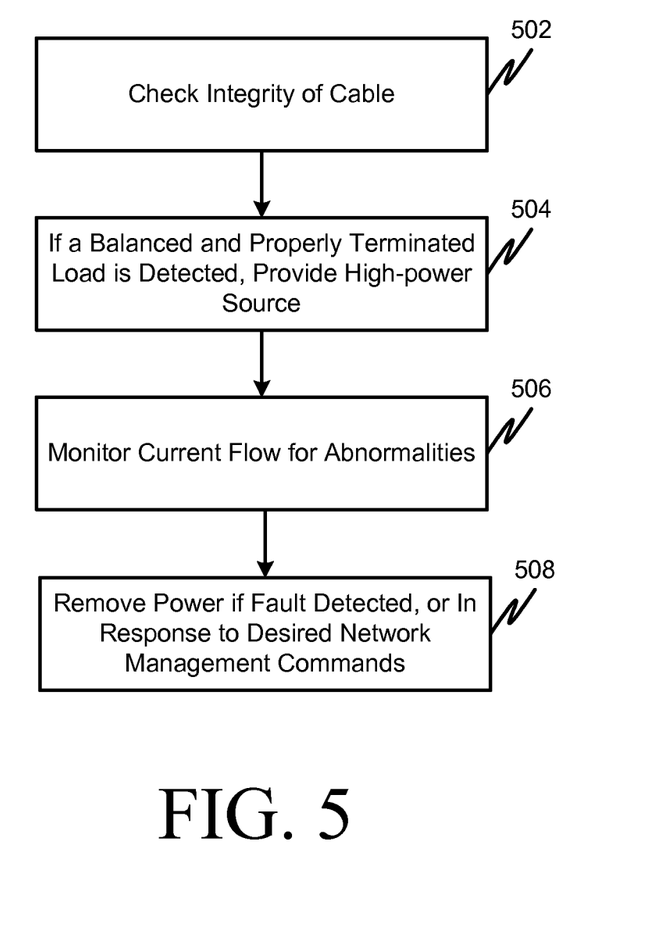
FIG. 5 is a flow chart of an example method for AC POE in accordance with at least one implementation.

FIG. 5 is a flow chart of an example method for providing AC power over a computer network. Processing begins at 502, where a cable integrity testing operation is performed. Testing or checking the integrity of the cables can include using a TDR and/or current sensing device to determine if any faults are present in the cabling. The types of faults that can be detected and the uses for the TDR in the cable integrity checking process are described in greater detail below. Processing continues to 504.

At 504, the high-voltage power (e.g., AC power) is provided if the integrity checking of step 502 indicates that a balanced and properly terminated load is present on the cable. Processing continues to 506.

At 506, the current flow of the AC power being provided from the switch to the power consuming device is monitored for abnormalities. Processing continues to 508.

At 508, power is removed (or stopped) if an abnormality or fault is detected in the high-voltage line or power being supplied. Alternatively, power can be removed under network management control based upon signals or instructions remotely sent across the associated Ethernet network, or commands and instructions originating within the switch itself. Such situations may include prioritization of power for critical devices in the event of an over-demand situation.

Figure 6:
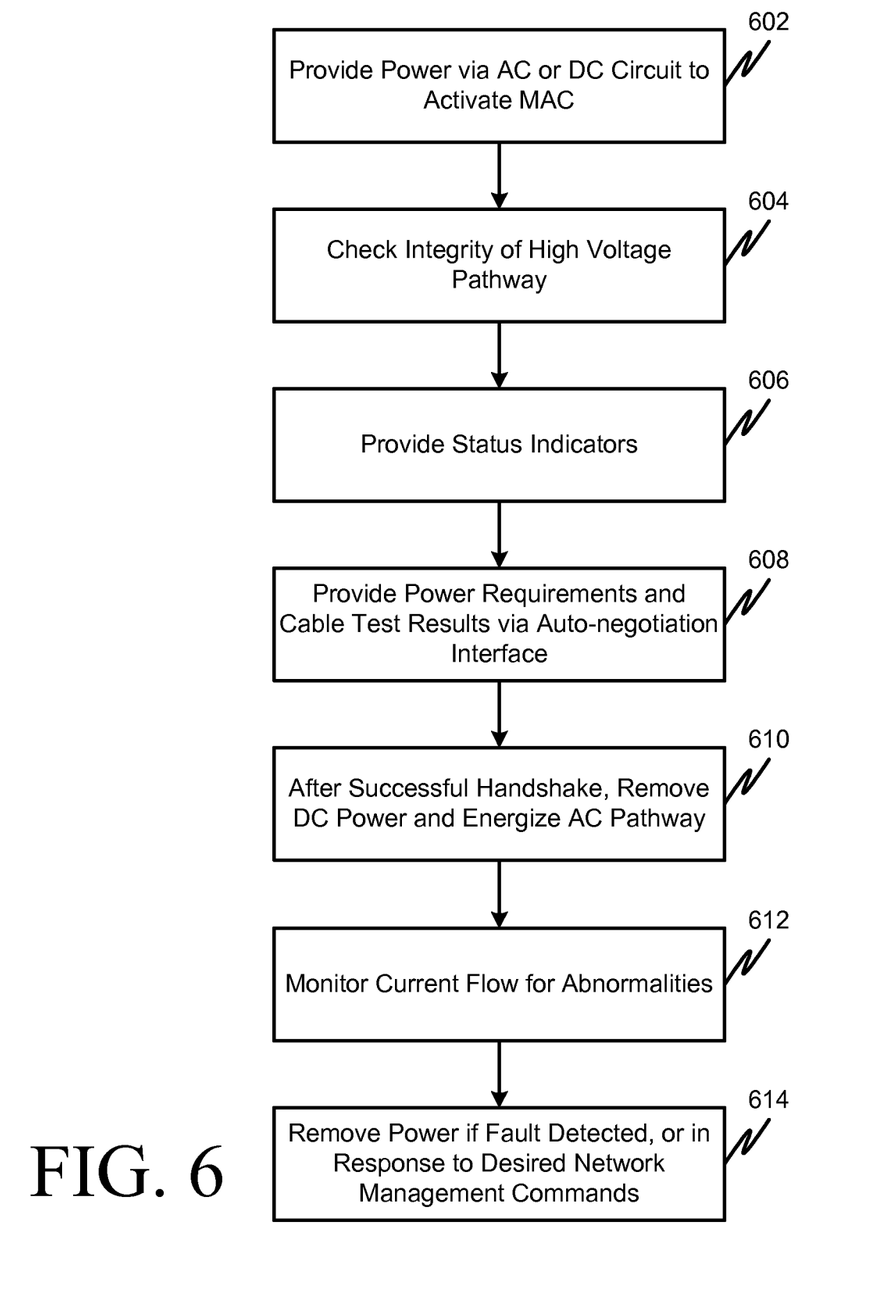
FIG. 6 is a flow chart of an example method for AC POE in accordance with at least one implementation.

FIG. 6 shows a flow chart of an example method for providing AC power over a computer network. Processing begins at 602, where relatively "safe" AC or DC power is provided from a switch to a power consuming device in order to activate communications and/or control electronics (e.g., a MAC in the power consuming device). Processing continues to 604.

At 604, the integrity of the high-voltage pathway is checked (e.g., via cable testers and/or current sensing elements). Processing continues to 606.

At 606, status indicators are provided to indicate the status of the high voltage connection (e.g., status LEDs on the switch and/or power consuming device can be activated to indicate the status of the connection). Processing continues to 608.

At 608, power requirements and/or cable test results can be provided from the power consuming device to the switch (e.g., via the MAC). Processing continues to 610.

At 610, after successful handshaking and receipt of the power requirements and/or cable test results, a higher-power AC power pathway can be applied. The initial DC power can optionally be removed. Processing continues to 612.

At 612, during the time that the AC power is being supplied from the switch to the power consuming device, the switch and/or power consuming device can monitor the cable (e.g., using the current sensing elements and/or cable tester). Status and other information regarding the state of the connection can optionally be exchanged between the switch and the power consuming device using the data network elements that are integral to Ethernet networks. Processing continues to 614.

At 614, power is removed (or stopped) if an abnormality or fault is detected in the high-voltage line or power being supplied. Alternatively, power can be removed under network management control based upon signals or instructions remotely sent across the associated Ethernet network, or commands and instructions originating within the switch itself. Such situations may include prioritization of power for critical devices in the event of an over-demand situation.

It will be appreciated that the steps mentioned above in FIGS. 5 and 6 can be repeated in whole or in part in order to accomplish a contemplated AC POE task.

Figure 7:
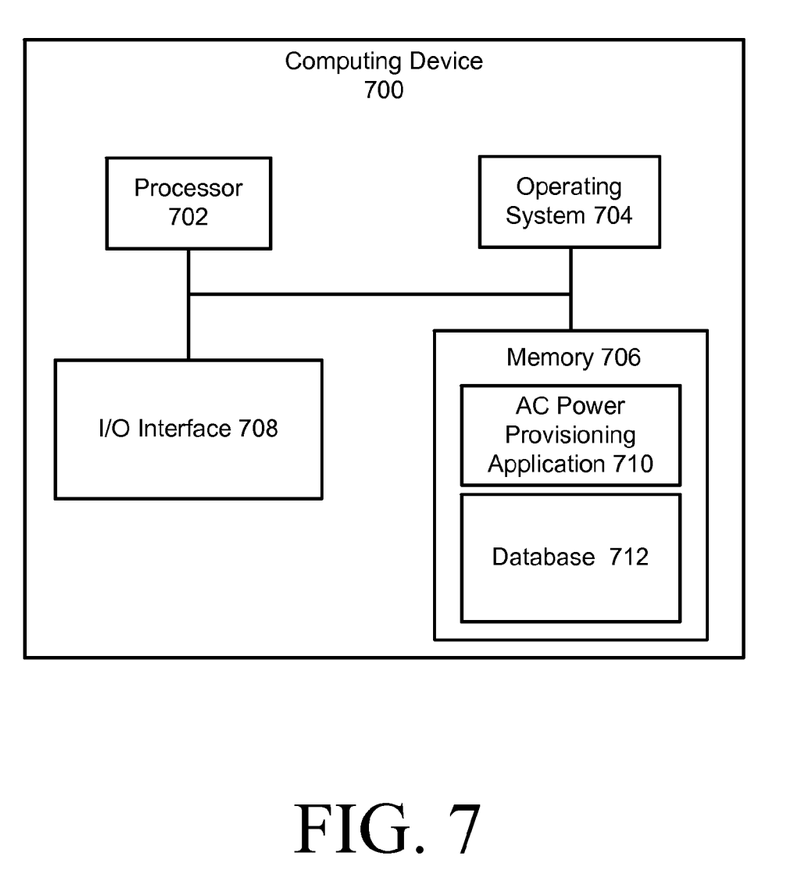
FIG. 7 is a diagram of an example computer system in accordance with at least one implementation.

FIG. 7 is a diagram of an example computer system for use in a POE switch and/or power consuming device. The computer system 700 includes a processor 702, operating system 704, memory 706 and I/O interface 708. The memory 706 can include an AC POE application 710 and database 712 for AC POE.

In operation, the processor 702 may execute the application 710 stored in the memory 706. The application 710 can include software instructions that, when executed by the processor, cause the processor to perform operations for network management in accordance with the present disclosure (e.g., performing one or more of the steps described above in connection with FIGS. 2-6).

The application program 710 can operate in conjunction with the files 712 and the operating system 704.

One possible fault that may be beyond the capabilities of a conventional GFI unit to handle, relates to the handshaking process described herein. If the remote power consuming device requests a certain amount of power, and the switch is monitoring the current flows in each leg, then power can be removed if the remote device starts exceeding the power level agreed to in the hand-shaking process.

Also, power can be removed if the remote power consuming device starts to draw an unequal amount of power down any of the monitored legs. For instance, in FIG. 2 there are 4 current monitoring elements (210, 212, 216, and 218) shown. If any element starts to show an unusual amount of current flowing then the switch can remove power (e.g., break the circuit). Examples would include a large current flow detected on one or more paths (but not all of them), which could indicate a short-circuit on one leg. A reduced (or smaller) current flow on one or more paths (but not all of them) could identify an open condition, or a situation in which the electricity has found an alternate path on which to return (other than through the desired cabling system).

Monitoring can leverage in-band link integrity processes which already exist in current Ethernet standards such as 10Base-T and 100Base-T. For example, link pulses can operate continuously in the background on the signal bearing cable pairs, and can provide a faster indication that the link is coming down (e.g., being disconnected). The real-time status associated with in-band link integrity pulses (that can be used to monitor network data flows) can be used to heighten the sensitivity of the current sensing circuitry.

In some implementations, the TDR can be used to check connections attached to the cable. In general, a TDR can determine whether a load of a particular impedance has been attached and at what distance. For example, if a user of an AC POE in accordance with at least one embodiment plugs in an expected load (e.g., a transformer) the switch can be configured to detect an expected impedance at a distance that is within our supported limits using the TDR.

Also, if a short-circuit is present in the wiring, then the switch won't be able to determine the expected impedance and will not proceed with applying power (or may terminate power if power is already being supplied).

Further, if nothing is attached to the cable, then the system can determine that an open-condition exists and will not proceed with applying power (or may terminate power if power is already being supplied).

A TDR can also be configured to determine the distance of the loads placed on a wire or cable. For example, if the measured distance determined by TDR 314 does not match the distance determined by TDR 320, within a reasonable tolerance, then a fault is declared and power is not applied. This leverages the fact that the AC POE system described herein can be configured to use structured wiring and all the wires are confined to a common bundle.

Also, a TDR can be used to determine if multiple loads have been put onto a wire. If more than one load is present, then the system will not proceed with applying power (or may terminate power if power is already being supplied).

A TDR can be configured to identify situations in which a stray element (e.g., a wire or a human being) may be touching or connected to a high-voltage cables. The stray element will show as an unexpected reflection point at a certain distance down the cable. The presence of stray elements would prevent the system from proceeding with the high-voltage application.

Just as there are a number of possible measurements that can be made of an absolute nature, a number measurements that are relative in nature (comparing one circuit to another) are possible. It is also possible for TDR elements to be located on the wires that are carrying in-band signals (e.g., packetized data). It is possible to compare TDR results between the cable pairs carrying AC and the cable pairs carrying in-band signals. By using the multiple TDRs, the system can determine whether the data source and the AC load are located at the same distance. Situations in which these distances don't match could indicate that someone is trying to improperly tap and/or isolate either the electrical or network connection.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking/telecommunications arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for AC POE.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method comprising:
providing direct current power from a data networking switch to a remote power consuming device, wherein a media access controller (MAC) of the remote power consuming device is activated by the direct current power;
performing a handshake operation between the data networking switch and the remote power consuming device to establish a communications link;
determining, at the data networking switch, an alternating current power requirement of the remote power consuming device, wherein the determining comprises receiving at a MAC of the data networking switch the alternating current power requirement communicated by the MAC of the remote power consuming device via the communications link during the handshake operation;
testing, at the data networking switch, an integrity of a cable connecting the data networking switch and the remote power consuming device;
removing the direct current power being provided from the data networking switch to the remote power consuming device; and
after removing the direct current power, providing alternating current power from the data networking switch to the remote power consuming device via the cable when the handshake operation is successful and a result of the testing indicates cable integrity sufficient for the alternating current power to be applied from the data networking switch to the remote power consuming device, wherein the remote power consuming device includes an alternating current load.

2. The method of claim 1, further comprising providing a status indication upon completion of the cable integrity testing.

3. The method of claim 1, further comprising monitoring, in real-time, the alternating current power being provided on the cable via one or more current sensing elements and removing the alternating current power when an abnormality in current flow is detected.

4. The method of claim 1, wherein the cable testing includes testing the cable using a cable tester.

5. The method of claim 4, wherein the cable tester includes a time-domain reflectometer.

6. The method of claim 1, further comprising removing the alternating current power being provided from the data networking switch to the remote power consuming device based on a signal received at the MAC of the data networking switch.

7. The method of claim 1, further comprising providing a ground connection, wherein the ground connection is one of: a ground connection on a center tap of a transformer and a safety ground connected to the remote power consuming device.

8. The method of claim 3, further comprising detecting the abnormality in current flow by sensing via the one or more current sensing elements that the alternating current power provided from the data networking switch to the remote power consuming device exceeds the power requirement.

9. A system comprising one or more processors configured to perform operations including:
determining, at a data networking switch, an alternating current power requirement of a remote power consuming device, wherein the determining comprises receiving at a MAC associated with the data networking switch, power requirement of the remote power consuming device transmitted from a MAC associated with the remote power consuming device;
performing, at the data networking switch, an integrity test of a cable configured to carry high power alternating current from the data networking switch to the remote power consuming device;
when the integrity test passes, connecting, at the data networking switch, a high power alternating current source, the high power alternating current source configured using one or more electrical transformers to provide alternating current power at a level based on the power requirement of the remote power consuming device, to the cable;
monitoring, at the data networking switch, current flow on the cable; and
removing the high power alternating current source if an abnormality is detected in the current flow.

10. The system of claim 9, wherein the integrity test passing includes detecting a balanced and properly terminated load connected to the cable.

11. The system of claim 9, wherein the operations further comprise providing a status indication upon completion of the cable integrity testing.

12. The system of claim 9, wherein the monitoring includes real-time monitoring.

13. The system of claim 9, wherein the cable integrity testing includes testing the cable using a cable tester.

14. The system of claim 13, wherein the cable tester includes a time-domain reflectometer.

15. The system of claim 12, wherein the real-time monitoring comprises monitoring in-band link integrity pulses.

16. The system of claim 9, further comprising providing a ground connection, wherein the ground connection is one of: a ground connection on a center tap of a transformer and a safety ground connected to the remote power consuming device.

17. A nontransitory computer readable medium having stored thereon software instructions that, when executed by one or more processors, cause the processors to perform operations including:
providing direct current power from a data networking switch to a remote power consuming device, the direct current power configured to activate a media access controller (MAC) of the remote power consuming device;
testing an integrity of a cable connecting the data networking switch and the remote power consuming device;
performing a handshake operation between the data networking switch and the remote power consuming device to establish a communications link;
determining, at the data networking switch, an alternating current power requirement of the remote power consuming device, wherein the determining comprises receiving at a MAC of the data networking switch the power requirement communicated by the MAC of the remote power consuming device via the communications link established; and
providing alternating current power from the data networking switch to the remote power consuming device via the cable when the handshake operation is successful and a result of the testing indicates cable integrity sufficient for the alternating current power to be applied from the data networking switch to the remote power consuming device, wherein the remote power consuming device includes an alternating current load.

18. The nontransitory computer readable medium of claim 17, wherein the operations further comprise:
    providing a status indication upon completion of the cable integrity testing; and
    monitoring, in real-time, the alternating current power being provided on the cable via one or more current sensing elements.

19. The nontransitory computer readable medium of claim 17, wherein the cable testing includes testing the cable using a time-domain reflectometer.

20. The nontransitory computer readable medium of claim 18, wherein the monitoring in real-time comprises monitoring in-band link integrity pulses.

\* \* \* \* \*